United States Patent
Kimber et al.

(10) Patent No.: US 7,688,344 B2
(45) Date of Patent: Mar. 30, 2010

(54) SYSTEMS AND METHODS FOR MEDIATING TELECONFERENCES

(75) Inventors: Donald G Kimber, Foster City, CA (US); Kazumasa Murai, Hadano (JP); Jonathan T Foote, Menlo Park, CA (US); Qiong Liu, Milpitas, CA (US); John Doherty, San Francisco, CA (US)

(73) Assignee: Fuji Xerox Co., Ltd. (JP)

( * ) Notice: Subject to any disclaimer, the term of this patent is extended or adjusted under 35 U.S.C. 154(b) by 1258 days.

(21) Appl. No.: 11/013,682

(22) Filed: Dec. 17, 2004

(65) Prior Publication Data

US 2006/0132607 A1    Jun. 22, 2006

(51) Int. Cl.
- H04N 7/14 (2006.01)
- H04N 5/232 (2006.01)
- H04N 5/228 (2006.01)
- H04M 11/00 (2006.01)
- H04M 3/42 (2006.01)
- G06F 15/16 (2006.01)
- H04N 5/225 (2006.01)

(52) U.S. Cl. ............ 348/14.08; 348/14.1; 348/211.12; 348/211.13; 348/222.1; 348/207.1; 379/93.17; 379/93.21; 379/202.01; 379/207.02; 379/207.03; 709/204

(58) Field of Classification Search ..... 348/14.01–14.1, 348/207.1–207.11, 222.1, 211.12–211.13; 709/203–204; 370/260; 379/202.01–207.01, 379/93.15–93.25

See application file for complete search history.

(56) References Cited

U.S. PATENT DOCUMENTS

| | | | |
|---|---|---|---|
| 5,859,663 A | * | 1/1999 | Simon ............... 348/14.07 |
| 6,484,208 B1 | * | 11/2002 | Hilland ................ 709/238 |
| 6,804,340 B2 | | 10/2004 | Howard et al. |
| 6,831,675 B2 | * | 12/2004 | Shachar et al. ....... 348/14.08 |
| 7,499,969 B1 | * | 3/2009 | van Os et al. .......... 709/203 |
| 2002/0065928 A1 | | 5/2002 | Senga et al. |
| 2002/0129290 A1 | * | 9/2002 | Couillard ............. 713/400 |
| 2004/0083488 A1 | * | 4/2004 | Fukuda ................. 725/38 |

(Continued)

FOREIGN PATENT DOCUMENTS

EP    0765083 A1 *  7/1992

(Continued)

OTHER PUBLICATIONS

Murai K., "Mediated Meeting Interaction for Teleconferencing," Jul. 2005, IEEE International Conference on Multimedia and Expo. 2005, pp. 1436-1439.*

(Continued)

*Primary Examiner*—Jason Chan
*Assistant Examiner*—Michael Osinski
(74) *Attorney, Agent, or Firm*—Sughrue Mion, PLLC

(57) ABSTRACT

Systems and methods for providing a status of a teleconference by determining an approximate delay time and providing a status signal in view of the determined approximate delay time are provided. An approximate delay time is approximately the amount of time that will elapse before an occurrence occurring at a first time, which is captured into an occurrence signal by a source unit, will be experienced at a second time after the occurrence signal is received by at least one receiving unit.

27 Claims, 6 Drawing Sheets

U.S. PATENT DOCUMENTS

| | | | |
|---|---|---|---|
| 2004/0153510 A1* | 8/2004 | Riddle | 709/205 |
| 2004/0264390 A1* | 12/2004 | Suzuki | 370/260 |
| 2005/0078171 A1* | 4/2005 | Firestone et al. | 348/14.08 |
| 2006/0123976 A1* | 6/2006 | Both et al. | 84/600 |

FOREIGN PATENT DOCUMENTS

| | | | |
|---|---|---|---|
| JP | 2002-158983 A | | 5/2002 |
| JP | 2002-158984 A | | 5/2002 |
| JP | 2004-120460 | * | 4/2004 |

OTHER PUBLICATIONS

Kerstin Fischer, Thora Tenbrink; "Video conferencing in a transregional research cooperation: Turn-taking in a new Medium;" http://nats-ww.informatik.uni-hamburg.de/~fischer/Vkfischertenbrink.pdf; 17 pgs.

Hans-Peter Domrnell, JJ Garcia-Luna-Aceves, "Activity Coordination Networked Media Application," Multimedia Systems 1997, 5:23-38 http://www.cse.ucsc.edu/research/ccrg/publications/peter.apcc95.pdf; 5 pgs.

Andrew S. Patrick, "The Human Factors of MBone Videoconferences: Recommendations for Improving Sessions and Software," http://ww.ascusc.org/jcmc/vol4/issue3/patrick.html; 48 pgs.

* cited by examiner

SYSTEMS AND METHODS FOR MEDIATING TELECONFERENCES

BACKGROUND

In face-to-face communications, people make eye contact with others, observe the body language of others, and observe the facial expression of others, etc. Experiments show, for example, that mouth motion starts about 0.4s to about 1.2s prior to speech, and thus facial expressions (e.g., mouth motion) can provide signals to others that a person may speak. In addition, in face-to-face communications the delay between the time a person communicates a message (e.g., says or does something) and the time another person receives (e.g., hears or sees) the communicated message is so small that it is substantially non-existent and inconsequential. These features of face-to-face communications aid in turn-taking during a conversation.

However, face-to-face communications involving, for example, people who have to travel to meet face-to-face are more and more-often being replaced by teleconferencing (e.g., videoconferencing, audio/video-chatting using audio/video enabled messenger tools). In some cases, people who live and/or work in the same area but in different buildings are opting to communicate via teleconferencing systems to avoid having to physically travel to the other building, for example. Teleconferencing has become popular in many environments (e.g., educational, business and personal environments) because, for example, a teleconference may eliminate the need for one or more of the conference members to travel to another location. However, some features of face-to-face communications, such as, eye contact ability, facial expression observation ability, and substantially quick receipt (i.e., with an unnoticeable delay) of a communicated message, etc. are generally not available, or are hindered, during teleconferencing.

Teleconferencing systems generally capture images and/or sounds at one site, encode them into a standard format, and transmit the encoded data over a network connection to another site which decodes the encoded images and/or sounds and outputs the decoded result thereof. Although progress is being made in developing faster systems and more efficient ways to use available bandwidth and/or to increase bandwidth, the encoding/decoding and transmission of the data generally causes a delay which impacts the teleconference. Even in teleconferences including video transmission, where images of one conference site are captured and transmitted to the other conference site and facial expressions may be thereby observed via the video images, due to transmission delays and/or poor data quality, teleconferencing generally does not allow for members/people to make eye contact and/or for members/people to sense that another member/person is about to speak based on facial expressions in a manner which would assist the members in turn-taking (i.e., taking turns communicating and listening), for example, during their teleconference based communications. However, instead of requiring, for example, a person to travel to another location to participate in a face-to-face communication with another person, the people involved generally agree to deal with "side-effects" of teleconferencing in order to eliminate the need for travel.

One common "side-effect" resulting from the lack and/or suppression of the above-described features of face-to-face communication in teleconferences, is collisions (i.e., a state where a local conference member and a remote conference member begin to communicate at one time). Although collisions occur during face-to face conferences, they occur much less often in face-to-face communications than they do during teleconferences. Further, when collisions occur during face-to-face teleconferences, because there is substantially no delay (i.e., such a small delay that it is unnoticeable) between the time one person talks and the time others hear and/or see the communicated message, collisions are generally overcome quickly and easily.

In contrast, in teleconferences, repeated collisions may occur before the situation is resolved because, in teleconferences, the lack or reduced ability to observe facial expressions and/or make eye contact is greatly exacerbated by the delays resulting from the need to encode/decode the data and to transmit the data over the network. More specifically, collisions tend to occur in teleconferences because, for example, conference members tend to forget that there is a delay in transmission and thus, out of habits based on face-to-face communications, a first conference member tends to break a period of silence and begin talking again before being interrupted by the receipt of the other party's response to the initial communication (even though that response was on its way (but not yet received) to the first conference member). In other instances, as a result of the silence, for example, conference members may be uncertain as to whether their initial communication was received and/or understood by the other party and thus, may instinctively begin to repeat their message before realizing that another member had responded to their communication (i.e., collision).

In other instances, in an attempt to prevent such collisions, conference members may patiently wait for a communication from the other party when, in fact, the other party had not communicated anything. Further, once a collision occurs each party may simultaneously refrain from communicating to allow the other party to finish their communication and then, upon a realization of such a mutual silence, both parties may begin communicating again substantially simultaneously, before realizing that another collision occurred. Such collisions during teleconferences are time-consuming and distracting.

SUMMARY

Systems and methods for mediating teleconferences and, more particularly, exemplary embodiments of systems and methods for providing signals for facilitating turn-taking and reducing, and preferably preventing collisions, during a teleconference are described.

A status providing system for a teleconference can include a delay determining unit for determining an approximate delay time, and a status signal generator for generating and providing a status signal. According to one embodiment, the approximate delay time is an approximate amount of time that will elapse before an occurrence occurring at a first time, which is captured into an occurrence signal by a source unit, will be experienced at a second time when the occurrence signal is received by at least one receiving unit, such that the approximate delay time is approximately equal to a difference between the first time and the second time. A status signal generator provides, at a status time, a status signal based on the occurrence and the determined approximate delay time. According to some embodiments, the status time is at least one of a time after a first time, but at least in part earlier than a second time when the occurrence is being received at a receiving unit and/or a time, at least beginning, upon passage of the determined approximate delay time from the first time.

A status providing system for a teleconference can include delay determining means and status signal providing means. The delay determining means determines an approximate delay time for experiencing, at a receiving unit, an original occurrence that is captured into an occurrence signal by a source unit. The status signal providing means provides, based on the determined approximate delay time, a status signal providing at least one of an indication that an original occurrence occurred before all portions of an occurrence signal are received by a receiving unit, an indication of an approximate delay time, and one portion of the original occurrence signal at a slower rate than an actual rate at which the portion of the occurrence originally transpired.

A method for providing a status of a teleconference can include capturing an occurrence signal based on an occurrence occurring at a first time, determining an approximate delay time, and providing a status signal. According to one embodiment, the approximate delay time is an approximate amount of time that will elapse before an occurrence will be experienced at a second time when an occurrence signal is received by at least one receiving unit, such that the approximate delay time is approximately equal to a difference between a first time when the occurrence occurred and the second time. Providing a status signal can involve providing, at a status time, a status signal via at least one of a source unit and a receiving unit, wherein the status signal is based on the occurrence and the determined approximate delay time and, according to some embodiments, the status time is at least one of a time that is, at least in part, earlier than a second time when the occurrence is experienced based on the occurrence signal and/or a time, at least beginning, upon passage of the determined approximate delay time from the first time.

These and other optional features and possible advantages of various exemplary embodiments are described in, or are apparent from, the following detailed description of exemplary embodiments of systems and methods for mediating teleconferences.

BRIEF DESCRIPTION OF THE DRAWINGS

Exemplary embodiments described herein will be described in detail, with reference to the following figures, in which.

DETAILED DESCRIPTION OF EXEMPLARY EMBODIMENTS

Throughout the following description, numerous specific structures/steps of some exemplary embodiments are set forth in order to provide a thorough understanding of the exemplary embodiments. It is not necessary to utilize all of these specific structures/steps.

Exemplary embodiments of status providing systems and methods will be described below in relation to teleconferencing systems. The exemplary embodiments may, however, be applied to any system or method of communicating so as to help reduce, and preferably prevent, collisions occurring as a result of data transmission delays. Accordingly, the invention is not limited to the exemplary embodiments described below.

Exemplary embodiments of systems and methods for providing a status of teleconferences and, more particularly, exemplary embodiments of systems and methods for providing status signals in order to facilitate turn-taking during a teleconference are described below.

Teleconferencing (e.g., videoconferencing, audio/video enabled real time messaging) systems generally capture images and/or sounds at one site, encode them into a standard format, and transmit the encoded data over a network connection to another site which decodes the encoded images and/or sounds and renders the decoded result thereof. As discussed above, the encoding/decoding and transmitting steps each take some time, and thus there is a delay between a time at which a first conference member at one (e.g., a local) location communicates something, via a teleconferencing system, and a time when a second conference member at a second (e.g., remote) location experiences what the first conference member communicated. The impact of such delays will be described in relation to FIG. 1.

Figure 1:
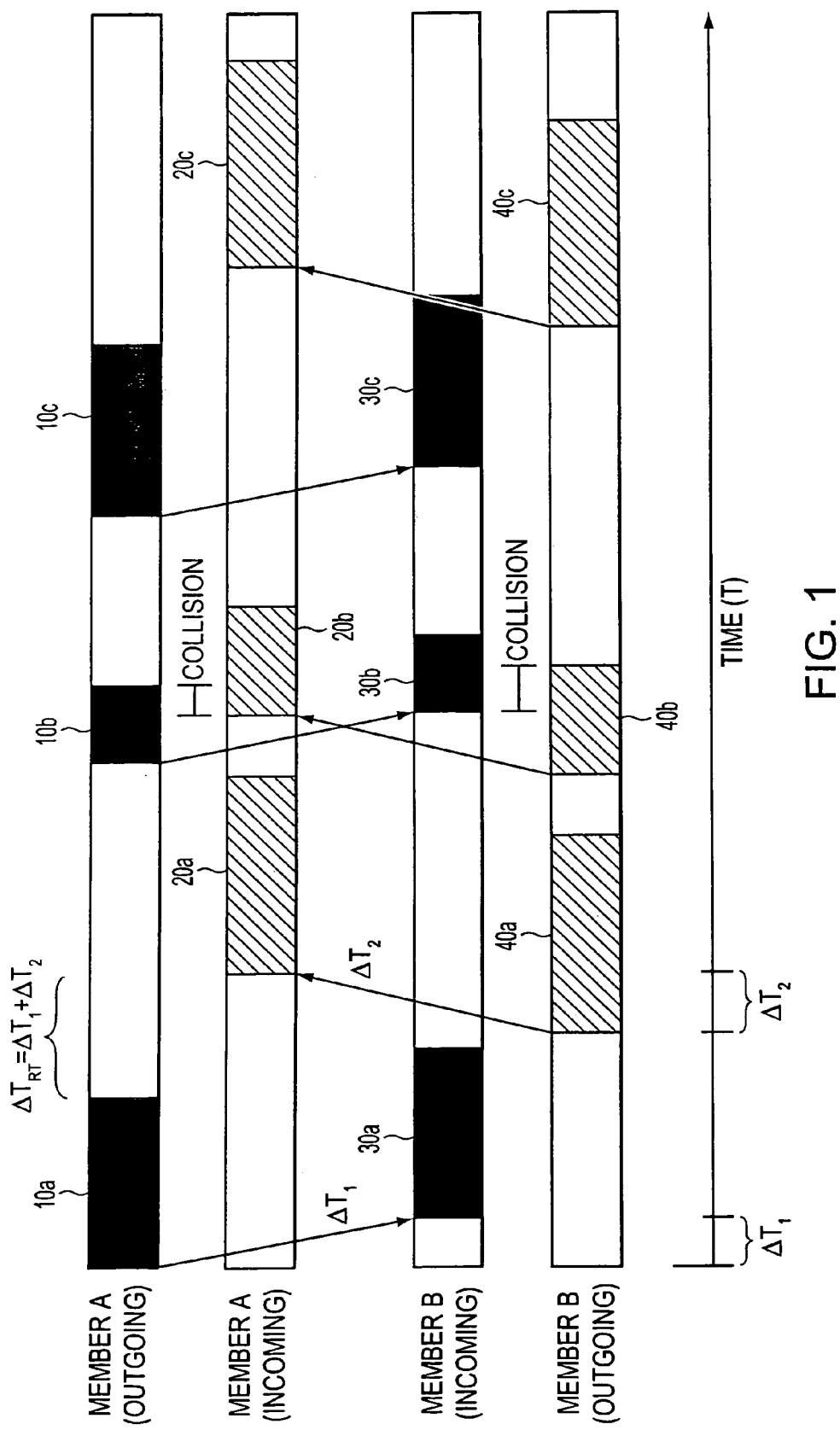
FIG. 1 is a state diagram of an exemplary teleconference.

FIG. 1 illustrates an exemplary teleconference. In particular, FIG. 1 illustrates an exemplary teleconference involving a first conference member A and a second conference member B. During the exemplary teleconference, each conference member A, B sends outgoing signals 10a-c, 40a-c and receives incoming signals 20a-c, 30a-c, based on the outgoing signal of the other conference member, at various points of time T during the teleconference.

In the exemplary teleconference, member A initiates the teleconference with outgoing communication 10a. Then, after the passage of time $\Delta T_1$, member B begins receiving, as incoming communication 30a, member A's outgoing communication 10a. That is, member B does not begin receiving member A's outgoing communication 10a until a time $\Delta T_1$ has passed from the time member A began the outgoing communication 10a. The time $\Delta T_1$ which elapsed before member B begins receiving member A's outgoing communication 10a is essentially the time that passed while: (1) member A's outgoing communication 10a was encoded, (2) the encoded communication was transmitted from member A's source unit to member B's receiving unit, and (3) that encoded communication was decoded and output.

A similar situation occurs when member B initiates an outgoing communication 40a. As illustrated in FIG. 1, member A does not begin receiving incoming communication 20a, which corresponds to member B's outgoing communication 40a until a time $\Delta T_2$ has passed. The time $\Delta T_2$ which elapsed before member A begins receiving member B's outgoing communication 40a is essentially the time that passed while: (1) member B's outgoing communication 40a was encoded, (2) the encoded communication was transmitted from member B's source unit to member A's receiving unit, and (3) that encoded communication was decoded and output.

As a result of the delays $\Delta T_1$ and $\Delta T_2$, member A should not expect to receive a response to outgoing communication 10a from member B until a time equal to a round-trip delay time $\Delta T_{RT} = \Delta T_1 + \Delta T_2$ has passed from the end of communication 10a.

However, as discussed above, since most communications occur in a face-to-face scenario, and in face-to-face communications, people do not experience such a delay, people are generally not accustomed to waiting for a round-trip delay time $\Delta T_{RT}$ to elapse before receiving a response. When communicating via a teleconferencing system, because the teleconferencing scenario emulates face-to-face communication more than other types of communications (e.g., e-mail; snail mail, telephone, etc.), people are particularly prone to acting as they would in face-to-face communications.

Therefore, for example, after communicating a first message in a teleconference environment, during the round trip delay time $\Delta T_{RT}$, a first conference member may incorrectly assume that a second member does not have a response, and/or that the first message may not have been successfully received by the second member, and thus the first member may start speaking again during the delay time $\Delta T_{RT}$ in order to convey a second message and/or to repeat the first message. After the first member starts speaking again, the first member may then begin receiving the second member's response (i.e., collision). As a result of the collision, the first member may stop, for example, halfway during the second message or repetition of the first message to listen to the second member's response. After listening to the second member's response, the first member may then begin responding to the second member's response, and after the second member receives the first member's response, the second member may also start speaking to say for example, "go ahead" and/or further respond to the first member's partial response. In such a scenario, after corresponding delay times, the members will realize that another collision occurred.

FIG. 1 illustrates a collision which occurs when member A communicates outgoing communication 10b and member B communicates outgoing message 40b such that member B begins receiving incoming communication 30b corresponding to member A's outgoing communication 10b before completing outgoing communication 40b, and member A begins receiving incoming communication 20b corresponding to member B's outgoing communication 40b before completing outgoing communication 10b. Fortunately, in the exemplary teleconference illustrated in FIG. 1, after the collision, member B does not begin outgoing communication 40c until after beginning to receive incoming communication 30c corresponding to member A's outgoing communication 10c and thus, member B does not begin receiving incoming communication 20c until after completing outgoing communication 10c.

Described below are various exemplary embodiments of systems and methods for mediating a teleconference in order to reduce, and preferably prevent, collisions, such as the one described above in relation to FIG. 1, from occurring during teleconferences. In the exemplary embodiments of systems and methods for providing a status of a teleconference described herein, various types of status signals for assisting turn-taking in order to reduce, and preferably prevent collisions, are provided. Status signals, such as, for example, signals which alert members about the existence of a delay, signals which inform members as to an approximate amount of the delay(s) (e.g., one-way delay, round trip delay, etc.), signals which inform members that another conference member has initiated a communication sufficiently prior to a time when the members will receive that communication, signals corresponding to portions of the communicated message which are transmitted via faster means and/or involve faster encoding/decoding, etc. are provided.

Figure 2:
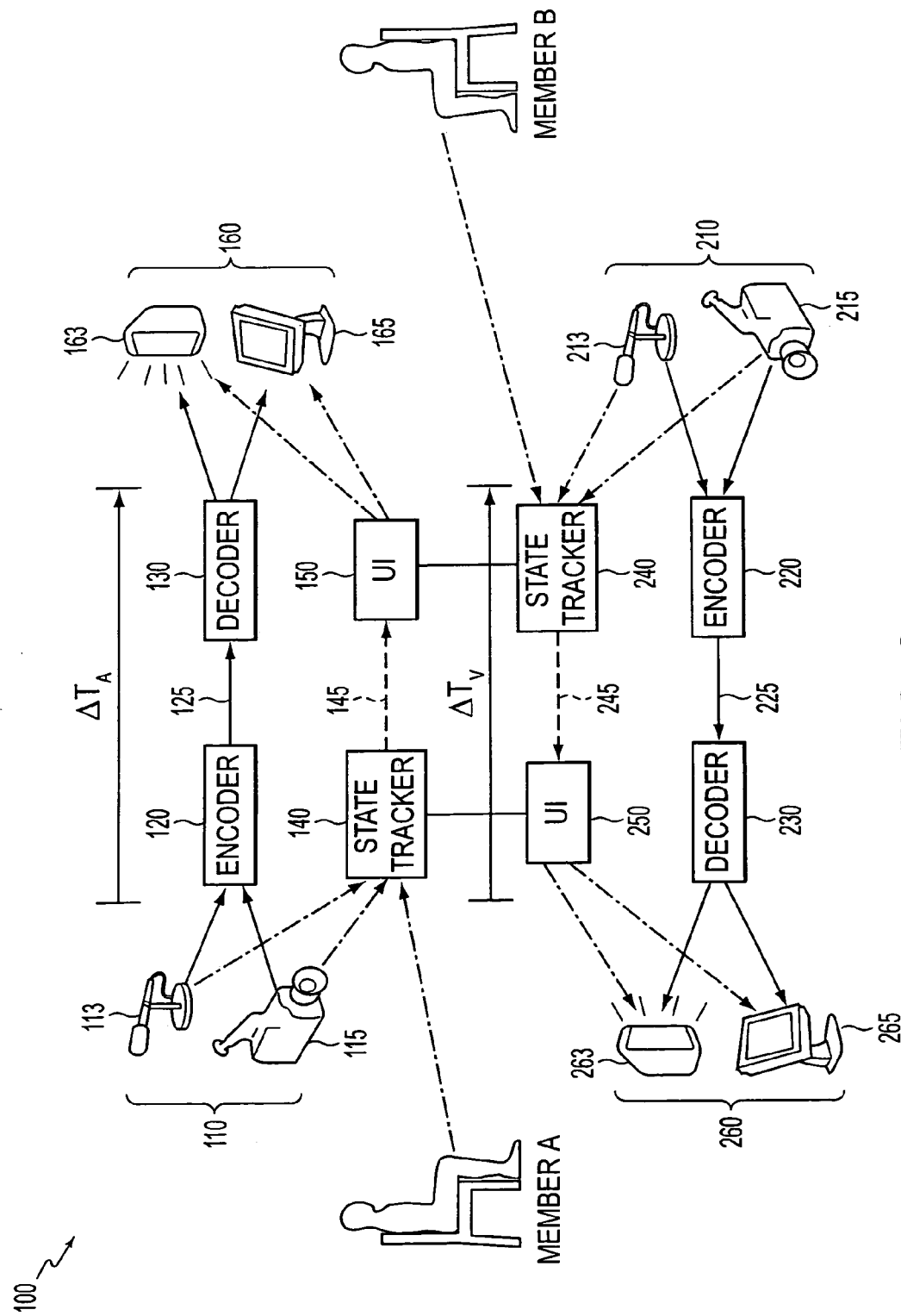
FIG. 2 is a diagram of an exemplary teleconferencing system employing an exemplary status providing system.

FIG. 2 is a diagram of an exemplary teleconferencing system employing a status providing system and/or method according to one or more of the exemplary aspects of the exemplary systems and methods for providing a status of a teleconference described herein. The exemplary teleconferencing system 100 illustrated in FIG. 2 is a teleconference between at least two members A, B. Although only two members (i.e., one member at each site) are illustrated, more than two sites may be participating in a teleconference and/or more than one member may be present at each site. Further, in some embodiments, the sites involved may be in different continents, different countries, different states, different cities, different buildings, different rooms, the same room. That is, the exemplary status providing systems and methods described herein may be used in any teleconferencing environment where at least one member is communicating with least one other member via source and/or receiving units of a physical and/or wireless communication line/system.

In the exemplary teleconferencing system 100 illustrated in FIG. 2, member A may utilize source unit 110 to send a communication to member B, who will receive member A's communication via receiving unit 160. Before member B receives member A's communication, member A's communication must be captured into a signal via, for example, the microphone 113 and camera 115 of member A's source unit 110. The signal generated based on member A's communication is then subjected to an encoding process via encoder 120 before being sent over a communication line/network 125 to a decoder 130 associated with member B's receiving unit 160. The decoder 130 decodes the signal generated based on member A's communication and plays and/or displays it on the speaker 163 and/or display 165 of member B's receiving unit 160 such that member B can experience member A's communication.

Similarly, in this exemplary embodiment of a teleconferencing system 100, member B may utilize source unit 210 to send a communication to member A, who will receive member B's communication via receiving unit 260. Before member A receives member B's communication, member B's communication must be captured into a signal via, for example, the microphone 213 and camera 215 of member B's source unit 210. The signal generated based on member B's communication is then subjected to an encoding process via encoder 220 before being sent over a communication line/network 225 to a decoder 230 associated with member A's receiving unit 260. The decoder 230 decodes the signal generated based on member B's communication and plays and/or displays it on the speaker 263 and/or display 265 of member A's receiving unit 260 such that member A can experience member B's communication.

In the exemplary embodiment illustrated in FIG. 2, the source units 110, 210 each include a microphone 113, 213 and a camera 115, 215 and the receiving units 160, 260 each include a speaker 163, 263 and a display 165, 265. Generally, for teleconferencing (e.g., videoconferencing) a camera, a speaker, a display and a microphone are provided at each site where there is at least one conference member such that the audio communications made at one site are received by the microphone and transferred to the speaker at the other site(s) and the camera sends a video signal of the site (generally including member(s) at the site) to the other site(s) where the display displays an image based on the received video signal. However, in some embodiments, the source unit may, for example, only include a camera or a microphone and/or include another device(s) capable of capturing images/sounds and similarly, in some embodiments, the receiving unit may, for example, only include a display or a speaker and/or include another device(s) capable of displaying an image and/or outputting sounds. Further, although in the exemplary embodiment of a teleconferencing system illustrated in FIG. 2, the source units 110, 210 both include a microphone 113, 213 and a camera 115, 215, in some embodiments all the members involved in the teleconference may not have access to a source unit including both a microphone and a camera, for example. Similarly, although in the exemplary embodiment of a teleconferencing system illustrated in FIG. 2, the receiving units 160, 260 both includes a speaker 163, 263, and a display 165, 265, in some embodiments all the members involved in the teleconference may not have access to a receiving unit including both a speaker and a display, for example. That is, it is not necessary for every conference member to have the ability to send and receive both audio and visual signals, as a conference member may sufficiently participate in the conference even with, for example, only one of audio and visual signal receiving and sending capability.

The exemplary teleconferencing system illustrated in FIG. 2 further includes a state tracker 140, 240 and a user interface 150, 250 associated with each member A, B, respectively. Each state tracker 140, 240 provides information regarding a state of communications between the members A, B to each user interface 150, 250 via a communication line 145, 245 so that each user interface 150, 250 can provide a status signal, for example, via the receiving unit 260, 160 of each member A, B, respectively. Although in the exemplary teleconferencing system illustrated in FIG. 2 both members A, B are associated with a state tracker 140, 240 and are capable of receiving status signals via their receiving units 260, 160, in some embodiments only one or some of the members may be associated with a state tracker and/or receive a status signal via a user interface associated with their receiving unit. Further, in some embodiments, the state tracker may, for example, only monitor one mode of communication (e.g., video) and/or the user interface may, for example, only be capable of providing a signal via one mode of communication (e.g., displaying an image).

Known communication means may be used for the communication lines 125, 225 and 145, 245. Generally, the communication means employed for communication lines 145, 245 is much faster that the communication means employed for communication lines 125, 225 in order to ensure that the status signal, based on data transmitted thereon, is provided well before an occurrence at one site is experienced at the other site(s). In some embodiments, communication lines 125, 225 may involve a series of communication links and each of the communication links may have different characteristics. One communication method may, for example, utilize a series of Integrated Services Digital Network ("ISDN") links, while a second communication method may utilize a dial-up connection to the Internet and an established Virtual Private Network ("VPN") connection to the Local Area Network ("LAN"). In various embodiments, the communication link or transmission network may be any known communication means, such as a private network, a public switch service, and may utilize any known technology, such as telecommunication and/or satellite technology. Further, the occurrence signal may be encoded/decoded or compressed/decompressed via any suitable compression/decompression or audio/video code-decode (e.g., codec) means, and the encoding/decoding process, as discussed above, introduces a latency (i.e., delay). Generally, in cases involving an occurrence signal(s) based on an occurrence captured via a camera and a microphone, the audio and visual portions of the occurrence signal may be transmitted independently. Further, in general, audio signals are capable of being experienced at sites other than the site at which they were originated faster than video signals. Inter-frame compression, which is used to maintain high quality video over low bit rates is one source and cause of generally more latency for a video signal than an audio signal. Also, in various embodiments, the audio and/or video occurrence signals may be subjected to buffering which is another possible source of large latencies. In order to provide the data (e.g., determined delay time(s)) to the user interfaces in a timely manner to help ensure that the status signal is received well before an occurrence at one site is experienced at the other site(s), in some embodiments, an out-of-band channel (e.g., User Datagram Protocol ("UDP")) may be employed for the communication lines 145, 245.

As discussed above, the encoding, decoding, buffering and/or transmission processes involved in teleconferences take time, and thus there is a delay before an occurrence (e.g., an action or spoken message) at one site is experienced at another site(s). FIG. 2 illustrates that there is an average delay time $\Delta T_A$ which transpires before an audio occurrence (e.g., spoken message) at the site of member A may be rendered at the site of member B, and an average delay time $\Delta T_V$ which transpires before a video occurrence (e.g. motion of lips during speech) at the site of member A is experienced by members at the site of member B. Typically, due to greater encoding complexity and/or the use of inter-frame compression for encoding video signals the delay time $\Delta T_A$ may be less than the delay time $\Delta T_V$. Therefore, generally, in order for members at the site of member B, for example, to experience audio and video occurrences that are substantially, and preferably, completely synchronized (e.g. "lip-sync" between speech and lip motion), the receiving unit 130 additionally delays the rendering of an audio signal so that the audio and video occurrences may both be experienced after a delay of $\Delta T_{AV} = \max(\Delta T_A, \Delta T_V) = \Delta T_V$ (i.e., substantially, and preferably, completely synchronized audio and video). In some embodiments, however, as discussed below with regard to FIG. 8, a portion of an occurrence signal (e.g., audio signal) is rendered with a delay which is less than a delay for another portion of the occurrence signal (e.g., $\Delta T_A < \Delta T_V$)

In some embodiments, at the beginning of a teleconference, during for example, the initial communication, the average delay time is determined by one or more of the state trackers. The state tracker may determine the one-way delay and/or the round-trip delay. Further, in some embodiments, the state tracker may determine the approximate delay a plurality of times (e.g., every $n^{th}$ communication) throughout the teleconference. In some embodiments, the state trackers may run on computers synchronized by clock synchronization protocols (e.g. Network Time Protocol (NTP) or Simple Network Time Protocol (SNTP)) and encoded data may be transmitted using real time transmission protocols (e.g. Real-time Transport Protocol (RTP) or Real-Time Streaming Protocol (RTSP)) so that delays may be determined continuously during use of the embodiment. In still other embodiments, the state tracker may determine the approximate delay time using, for example, a look up table (LUT) including average delay times based on the location of the conference sites and/or the transmission means and/or the teleconferencing system, etc. The LUT may include set average times, for example, for domestic teleconferences, transpacific teleconferences, local teleconferences, etc. The state tracker then provides the determined information (e.g., approximate time delay) to the user interface(s) involved, such that the user interface can provide the members associated therewith one or more status signals to help facilitate turn-taking during the teleconference and reduce, and preferably prevent, collisions. Exemplary forms of status signals and user interfaces will be described below in relation to FIGS. 4-7.

Figure 3:
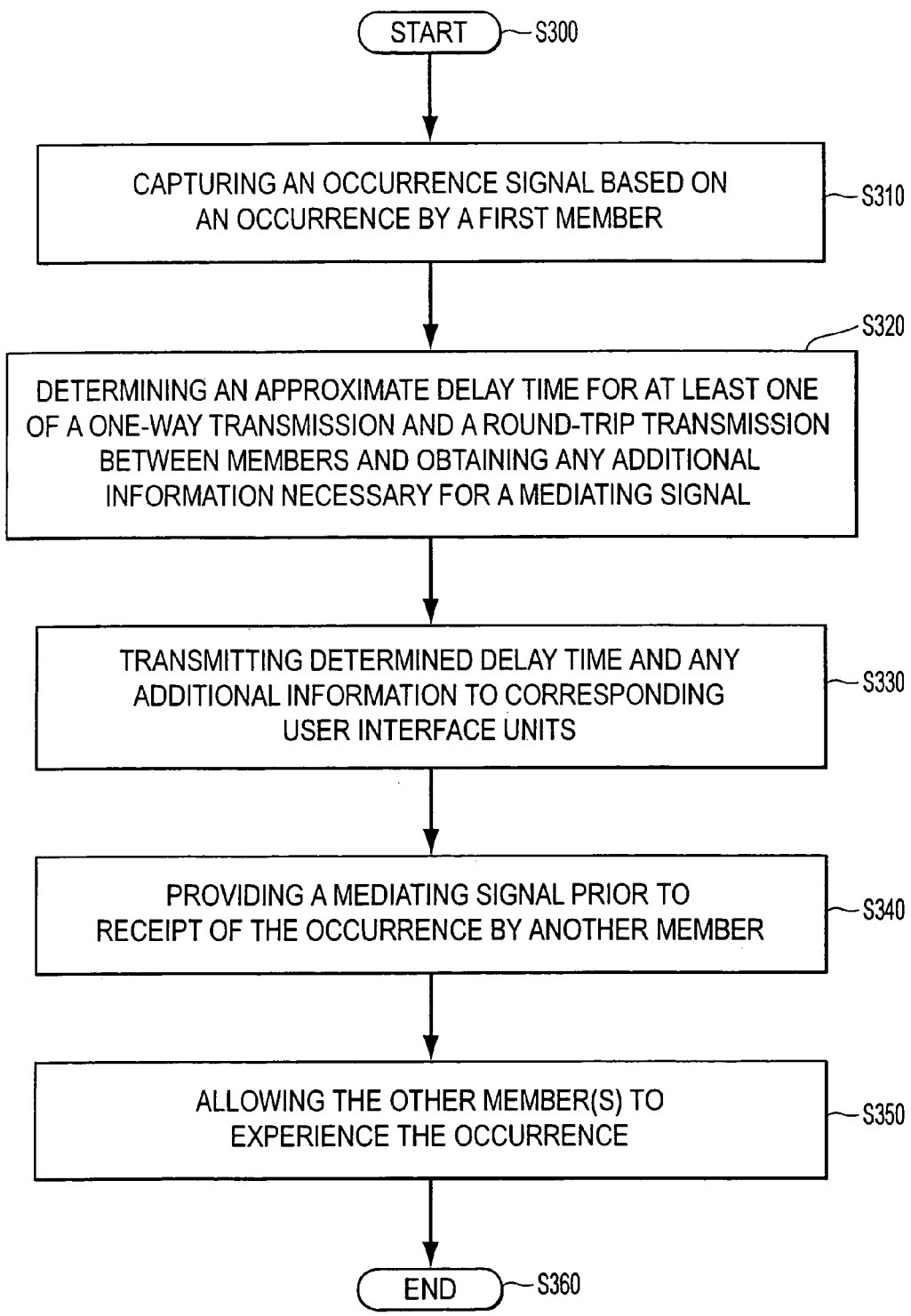
FIG. 3 is a diagram of an exemplary method for providing a status of a teleconference.

FIG. 3 illustrates a flow chart of an exemplary method for providing status signals during a teleconference. The method starts at step S300 where the teleconference is initiated. At step S310, an occurrence signal is generated based on an occurrence occurring at a first site. The occurrence signal in this embodiment is the signal that transmits the video and/or audio. After the occurrence signal is generated, an approximate delay time for transmitting the occurrence signal to a second site is determined at step S320. The approximate delay time may be, for example, an approximation of a one-way delay time for that occurrence, a two-way delay time for that occurrence, an average one-way delay time for occurrences in general between the first site and the second site and/or an average round-trip delay time for occurrences in general between the first site and the second site. In teleconferences involving more than two sites, the approximate delay times determined may be, for example, delay times for each pair of source and receiving units and/or the delay time between the farthest situated (or slowest transmitting) source and receiving units. As discussed above, the average approximate delay time may be determined, for example, based on a set delay value, based on an input time (i.e., an delay amount entered by a conference member), by sending and/or receiving a sample signal or the first communication of the teleconference when the teleconference is first initiated, by calculating an approximate delay time for each communication based on, for example, the amount of data corresponding to that message, the transmission type and/or the distance(s) involved in that teleconference, negotiated quality-of-service (QoS) parameters of the network connection, and/or by obtaining an approximate delay time(a) using a LUT. In some embodiments, separate approximate delay times may be determined for audio and video.

After the delay time is determined, at step S330, the determined delay time and any additional data necessary for the status signal is transmitted to the corresponding user interface (s) via a means (e.g., a particular transmission protocol on a communication line), which is generally faster than the means by which the encoded occurrence signal is transmitted (e.g., particular codec, transmission protocol, buffering scheme). After the determined delay time and any additional data is received by the user interface, at step S340, a status signal for facilitating turn-taking during the teleconference is provided by the user interface at one or more sites prior to experiencing at least a first part of the occurrence at the other site(s) and/or at a time corresponding to passage of the determined average approximate delay time after at least the start of the occurrence. For example, in some embodiments, the status signal is provided to a receiving site(s) at a time prior to the time, at least the first part of the occurrence is experienced by the receiving site(s), the status signal provides the members at the receiving site(s) some indication that something is coming and that he/she/they should wait to experience it. In some embodiments, the status signal is provided to the source site upon passage of the determined approximate delay time and thus, the status signal provides an indication as to approximately when the occurrence signal generated by the source site is, has or is about to be experienced at the receiving site(s). In various embodiments, one, both and/or other types or combinations of status signals according to one or more aspects of the invention may be employed. The status signal or at least one of the status signals provided is generally based on the determined average approximate delay time (as determined in S320) such that, for example, the status signal is provided upon passage of the determined average approximate delay time after at least the start of the occurrence, the color/shade of an object changes from a first color/shade to a second color/shade over the course of the determined average approximate delay time or a bar/clock hand moves over the course of the determined average approximate delay time, a clock display counts down to zero over the course of the determined average approximate delay time, etc. After the status signal is provided, at step S350, the member(s) at the other site(s) experience the occurrence, hopefully, without any collision(s). The process ends at step S360, when the teleconference is concluded.

Various types and forms of status signals may be employed in various embodiments. A status signal may, for example, be a signal based on a determined average approximate one-way delay time in order to provide an indication as to when a local occurrence (i.e., occurrence which occurred at that site) will be, or is being, experienced by a remote site (i.e., a site other than the site at which the occurrence occurred). A status signal may, for example, be a signal based on a determined average approximate round-trip delay time in order to provide an indication as to when, after a local occurrence, a response to that local occurrence should and/or can be expected to be received at the local site.

Status signals may, for example, be based on the happening of an occurrence at one of the sites such that a signal that an occurrence has taken place at another site is provided to members at remote sites. Other status signals may, for example, be based on exactly which member of the teleconference and/or which site recently communicated and/or is still communicating something which will be experienced at the remote sites after the delay time elapses. Known systems for detecting/determining which member of conference communicated (e.g., spoke) may be employed. Such exemplary status signals may, for example, be communicated by making an object which is displayed on the displays 165, 265 change color, for example, from a first shade of a color (i.e., lightest or darkest) to a second shade of the color at a rate based on the determined delay times (e.g., average approximate round trip delay time). In some embodiments, status signals may, for example, be provided only if the determined average approximate delay time is greater than a certain threshold. In some embodiments, status signals may be a portion (e.g., audio signals) of the occurrence which is capable of being experienced at the receiving site(s) before remaining portions (e.g., video signals) of the occurrence signal can be experienced.

Figure 4:
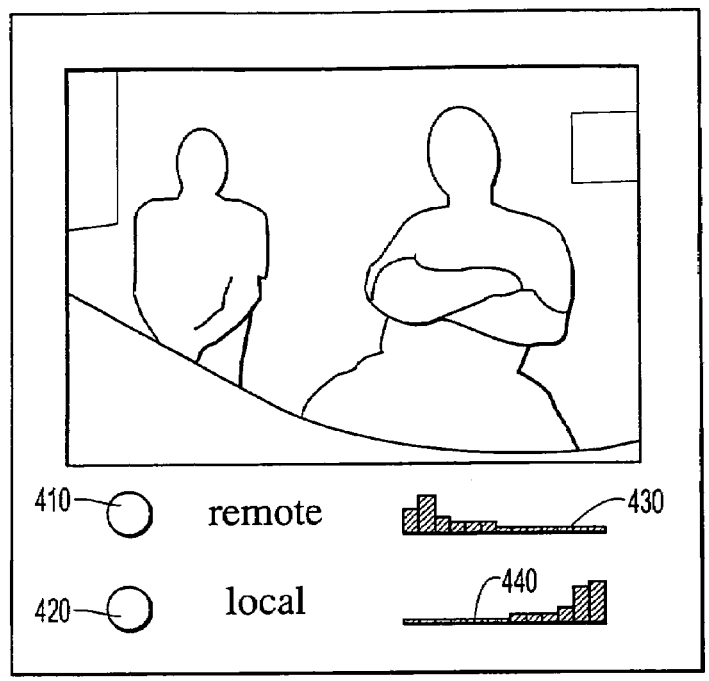
FIG. 4 is a diagram of one exemplary interface for providing a status of a teleconference which may be employed by the teleconferencing system illustrated in FIG. 2.

FIG. 4 is a diagram of one exemplary interface for providing a status of a teleconference which may be employed by a teleconferencing system, such as the exemplary teleconferencing system illustrated in FIG. 2. In various embodiments, the status signal may be in the form of, for example, a visual signal and/or an audio signal. FIG. 4 illustrates an exemplary video interface employing two forms of visual status signals. One of the exemplary status signals illustrated in FIG. 4 is an object 410, 420 (e.g., a circle) which changes color/shade depending on which site is communicating. Another of the exemplary status signals illustrated in FIG. 2 is a traveling-wave display 430, 440 which also changes color/shade based on the audio signal at the sites.

The exemplary color changing visual object (e.g., circles) status signals 410, 420 illustrated in FIG. 4 provide visual indications as to whether a member(s) at that site is talking by coloring/shading the object a first color known to represent a communicating source. The object may, for example, have a second color/shade if a member has requested to have the floor next by, for example, pressing a button, or if the state tracker is able to detect that a member is about to speak by known methods. For example, the state tracker may determine which member is about to speak based on a member's mouth motion, body motion/gesture, etc. More particularly, for example, the state tracker may determined which member is gesturing via a motion detector. Further, for example, the object may become lighter or darker, for example, indicating that the communicating source is about to give up the floor.

The exemplary traveling wave status signals 430, 440 illustrated in FIG. 4 provide visual indications as to when the incoming and/or outgoing occurrence signal(s) has "cleared the channel". The traveling wave status signal indicator consists, for example, of a plurality of vertical bars, a characteristic (e.g., height, width, color, motion, etc.) of each bar corresponding, for example, to an audio level at a point in time, such that the plurality of bars represent audio levels over an interval of time. For example, the indicator 440 shows the level of the audio signal generated at a the local site (where the interface of FIG. 4 is being presented) over time. The height of the leftmost bar indicates the current audio level, and the heights of successive bars to the right indicate audio levels after successively larger time delays. So, for example, conceptually, the traveling wave status signals 430, 440 show the audio level of the audio signal(s) associated with the audio portion of the occurrence signal as it travels through the communication lines/network. The last bar of the traveling wave visual signal is selected/displayed (e.g., highlighted, projecting) when the average round-trip delay time for communication between sites involved in the teleconference has passed. That is, for example, when the traveling wave visual signal clears (i.e., the color, highlight, projection has passed through the visual signal and, for example, all the bars have a shortest height), that is the earliest approximate time that a reply may be expected from the other site (i.e., site other than the source of the last communication). In the exemplary embodiment, the visual indicator 430 shows the level of audio for the remote site(s). In the case of multiple remote sites, it could show, for example, the maximum audio level for any site. Because the status signal used to generate 430 may be encoded, transmitted, and rendered with less delay than the delay between the time of an audio occurrence at a remote site and the time of its rendering at the local site, local members will see a visual indication that audio is "incoming" before they begin to see and hear that occurrence.

While the exemplary interface illustrated in FIG. 4 provides a plurality of signals relating to both the status of the local site and the remote site, in some embodiments, the interface may only include, for example, a single status signal relating to the state of one site (e.g., local or remote). For example, as discussed above, in some embodiments, at a source unit of an occurrence signal, a single status signal may be provided which indicates that the estimated delay time has passed and thus, the occurrence signal should be, have been or about to be experienced at a remote site. In such embodiments, a status signal may be provided based, for example, on an estimated delay time for transmission of the occurrence signal, from the source unit to a receiving unit (or, for example, an average delay time for transmission to all receiving units) such that, at the source site, upon passage of the estimated delay time after the occurrence, for example, an audio and/or video signal is rendered which provides an indication that the estimated delay time has passed and, at least the start of the occurrence should be received by the receiving unit at or about that time. The signal may be, for example, an audio signal (e.g., a beep) at the point in time immediately after passage of the delay time or, for example, may be a traveling wave which is flat (e.g., no signal) during passage of the estimated delay time and then, upon passage of the estimated delay time, a bar of the traveling wave begins moving and subsequent bars continue moving until the time interval of that occurrence (e.g., time period which elapsed from start of a message to completion of the message) also passes providing an indication that the receiving site should have already or should be about to experience all of that occurrence (i.e., receiving all of the message). In some embodiments, as discussed above, at a receiving unit of an occurrence signal generated at a source unit, at another site, for example, a single status signal may be provided which indicates that something is coming (e.g., a video and/or audio message) before the occurrence signal is experienced at the site of the receiving unit. In such embodiments, after an occurrence, or at least a start of an occurrence, a status signal rendered in the form of an audio signal (e.g., beep) and/or a video signal (e.g., color changing blob) may be provided as a yield (i.e., wait, be patient, something is incoming).

Figure 5:
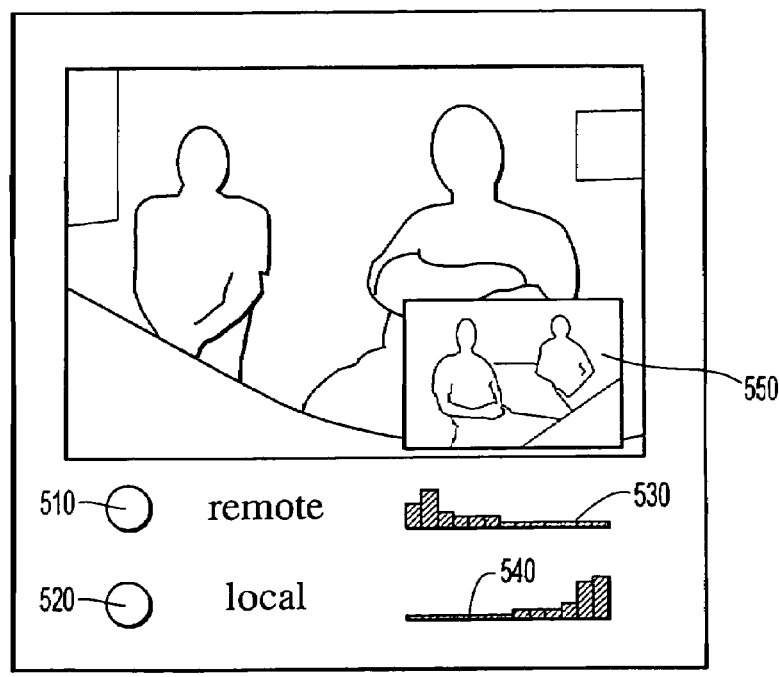
FIG. 5 is a diagram of another exemplary interface for providing a status of a teleconference which may be employed by the teleconferencing system illustrated in FIG. 2.

FIG. 5 is a diagram of another exemplary interface for providing a status signal for a teleconference which may be employed by a teleconferencing system, such as the exemplary teleconferencing system illustrated in FIG. 2. The exemplary interface illustrated in FIG. 5 is similar to the exemplary interface illustrated in FIG. 4. That is, exemplary status signals 510, 520, 530 and 540 are similar to the exemplary status signals 410, 420, 430 and 440 illustrated in FIG. 4. The exemplary interface illustrated in FIG. 5 further includes a video image 550 of the locally captured video signal being transmitted to other sites (e.g., remote sites). Such an exemplary video image 550 may be shown with a time delay matching the time delay for transmission to remote sites, so that it will be seen locally at the same time that it is seen remotely. This aids members at the local site in awareness of the latency.

Figure 6:
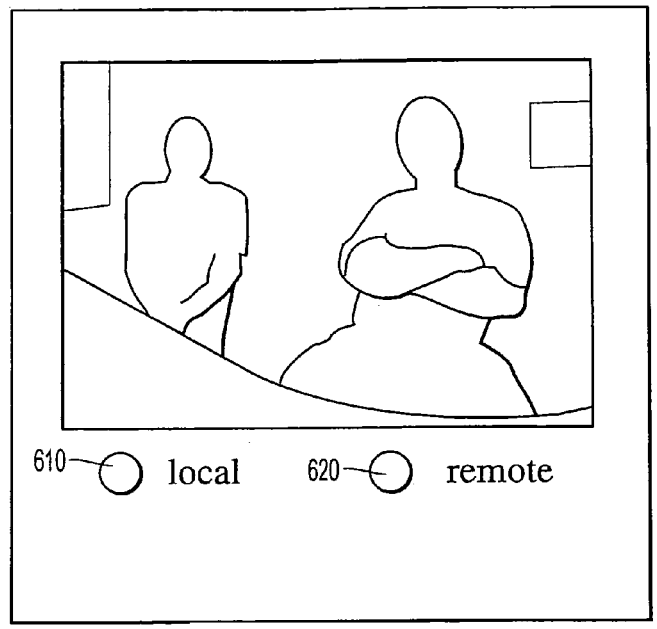
FIG. 6 is a diagram of another exemplary interface for providing a status of a teleconference which may be employed by the teleconferencing system illustrated in FIG. 2.

FIG. 6 is a diagram of another exemplary interface for providing a status signal for a teleconference which may be employed by a teleconferencing system, such as the exemplary teleconferencing system illustrated in FIG. 2. In FIG. 6 the visual status signals 610, 620 are in the form of objects. The visual status signal 610 is in the form of an object (e.g., a circle) which changes color, for example, based on whether an occurrence from that site (i.e., local site) is being transmitted. For the purpose of this interface, the occurrence could be defined for example as an audio level exceeding a threshold, indicating that a member is speaking. The visual status signal 620 is rendered in the form of an object which changes color, for example, based on whether an occurrence, which occurred at another site involved in the teleconference, is being transmitted (i.e., will continue changing colors until, for example, the determined average approximate delay time elapses from a start time of the occurrence and/or the determined average approximate delay time elapses from the end time of the occurrence).

Figure 7:
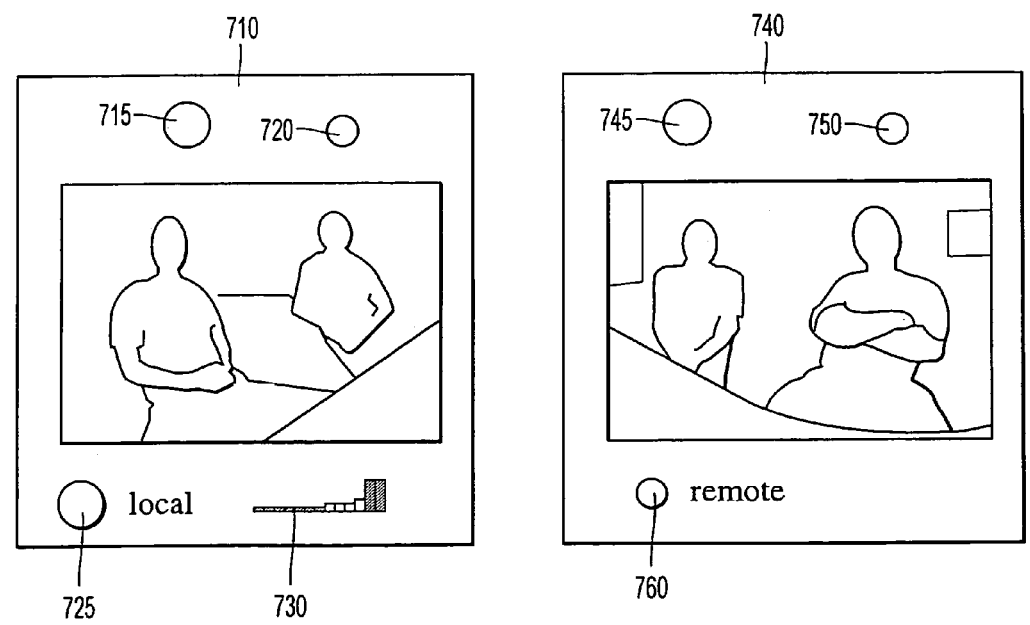
FIG. 7 is a diagram of another exemplary interface for providing a status of a teleconference which may be employed by the teleconferencing system illustrated in FIG. 2.

FIG. 7 is a diagram of another exemplary interface for providing a status of a teleconference, which may be employed by a teleconferencing system, such as the exemplary teleconferencing system illustrated in FIG. 2. The exemplary interface illustrated in FIG. 7 provides an image of the local site 710 (i.e., the image of the site which will be observed by other members at remote locations) and an image of a remote site 740 at which an occurrence recently occurred and/or is still occurring. In the image of the local site 710, status signals 715, 720, 725 and 730 are provided. In the image of the remote site 740 status signals 745, 750 and 760 are provided. Status signals 715, 720, 745 and 750 are provided around each conference member displayed on the interface. The size of the object (e.g., circle) may, for example, indicate how much that member has spoken/acted during the teleconference thus far. The color of the object (e.g., circle) may, for example, indicate whether the member is currently speaking, almost finished speaking, waiting to speak, etc. The status signals 725, 760 are objects (e.g., circles) which change color based on whether, members at that site are currently communicating, waiting to communicate, waiting to experience an occurrence, etc. The status signal 730 in the form of a traveling wave indicates, for example, the approximate status of their last communication at the remote sites (i.e., the members at the remote site are still experiencing the local members' last communication, the members at the remote site have not begun to experience the local members' last communication, the members at the remote site just finished experiencing the local members' last communication, etc.) At least the status signal 730 is based on the determined delay time(s).

Figure 8:
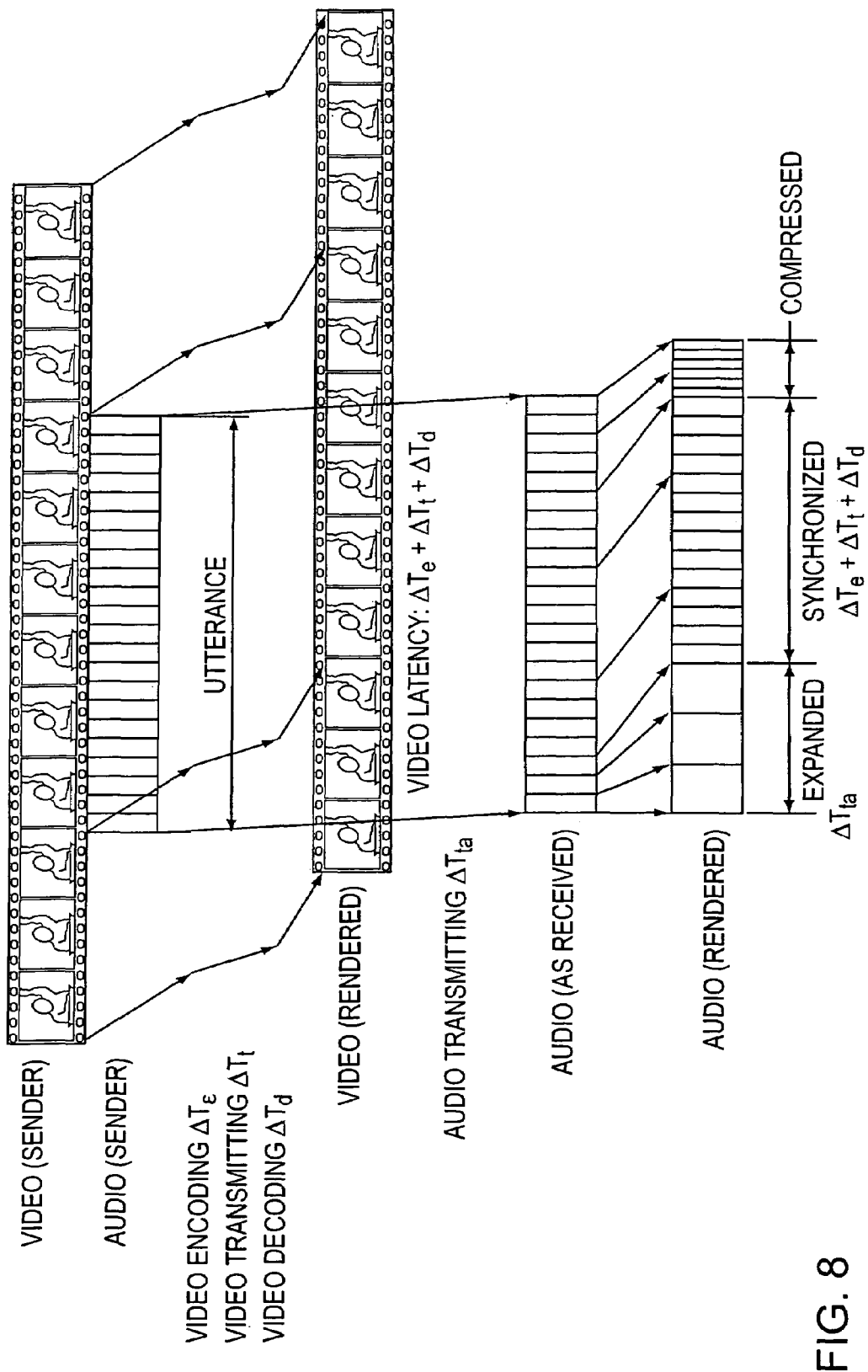
FIG. 8 is a state diagram of an exemplary teleconference employing an exemplary status providing system.

FIG. 8 is a state diagram of an exemplary teleconference employing a system for providing a status of a teleconference, which may be employed, by a teleconferencing system, such as the exemplary teleconferencing system illustrated in FIG. 2. In this exemplary embodiment, the audio portion of an occurrence initially is rendered at a slower speed (i.e., experienced at remote sites at a speed which is slower than the rate at which the audio was generated) but with less delay than the video portion of the occurrence. Initially the audio and video portions are asynchronously played/displayed until they are synchronized. Although in such an embodiment there is a time when the video portion and the audio portion of an occurrence signal are not synchronized, by the earlier start of the audio signal, members will realize that an occurrence signal is coming and that they should wait to experience the occurrence signal. More particularly, for example, in the exemplary portion of a teleconference illustrated in FIG. 8, video is encoded over time period $\Delta T_e$, video is transmitted over time $\Delta T_t$, and video is decoded over time period $\Delta T_d$ and thus the video signal starts to be rendered at a remote site after a video latency (delay) period equal to about $\Delta T_V = \Delta T_e + \Delta T_t + \Delta T_d$. On the other hand, the audio signal is transmitted to the remote site without encoding/decoding or with an encoding/decoding process which causes an ignorable $\Delta T_{ta}$. In such embodiments, $\Delta T_{ta}$ is almost equal to $\Delta T_t$, and less than $\Delta T_V$.

The audio, which is thus received first, is rendered at a slow speed until it is synchronized with the video signal. Such audio time-warping can be done in real time by any known method that changes the playback speed, preferably, without changing its pitch information. Time domain methods have been widely used for this purpose. Because the audio playback speed is slower than its real speed, audio latency increases as it plays and thus, generally reaches the same latency as the latency of the video channel. Once the audio and video signals are synchronized, the audio is played at regular speed and synchronization is maintained. In some embodiments, when it is detected that the audio utterance is over, or almost over, the audio signal is sped up again in order to "give up" the turn as soon as possible to the next member. This also returns the audio rendering system to a state of lower latency than the video, so that the next occurrence of audio by the same speaker could be played in advance of the video.

In such an embodiment, the rate of the audio signal can be modified in such a manner which still leaves the speech sounding natural. Such an embodiment is particularly useful in teleconferences experiencing one-way delays of about 0.6 sec or more.

In various embodiments, a delay determining unit may determine, for example, the approximate delay time for each occurrence, for every $n^{th}$ occurrence, every time a new site joins the conference, every time a conference site drops from the conference, and/or once at the beginning of a teleconference. In various embodiments the delay determining unit may determine, for example, the approximate delay time based on a predetermined set delay time, an input delay time, a sample signal, an actual occurrence signal and/or a LUT. In embodiments where either an actual signal or a sample signal is used to determine the approximate delay time, the actual or sample signal is sent and the time delay for a one-way and/or round trip communication between, for example, the farthest locations is determined. In embodiments where a LUT is employed, the LUT may have average delay times based on conference site locations, transmission types, etc. stored therein.

While the exemplary embodiments have been outlined above, many alternatives, modifications and variations will be apparent to those skilled in the art. Accordingly, the exemplary embodiments, as set forth above, are intended to be illustrative and not limiting.

What is claimed is:

1. A status providing system for mediating a teleconference to reduce collisions occurring as a result of data transmission delays and to facilitate turn-taking during the teleconference, the teleconference being conducted between a first participant and a second participant, the first participant being at a first unit including a first source unit and a first receiving unit, the second participant being at a second unit including a second source unit and second receiving unit the status providing system comprising:

a delay determining unit for determining an approximate delay time, the approximate delay time including an approximate time elapsed before an occurrence occurring at a first time, which is captured into an occurrence signal by the first source unit, is experienced at a second time occurring after the occurrence signal is received by the second receiving unit, the approximate delay time being approximately equal to a difference between the first time and the second time, wherein the occurrence signal is at least one of a video occurrence signal and an audio occurrence signal captured by the source unit comprising at least one of a camera and a microphone, and the occurrence is experienced when the at least one of the video occurrence signal and the audio occurrence signal is received by the receiving unit comprising at least one of a display and a sneaker; and a status signal generator, wherein after the occurrence, the status signal generator provides based on the occurrence and the determined approximate delay time, a status signal at a status time, the status time being at least one of a time including-a time earlier than the second time and a time, at least beginning, upon passage of the determined approximate delay time from the first time, the status signal being provided to the second participant in the teleconference at the second receiving unit and wherein the status signal comprises information indicative of a timing constraint on a second live communication of the second participant necessary to reduce or avoid a live communication collision with a first live communication of the first participant. expected to be received by the second receiving unit, wherein the timing constraint comprises a delay of the first live communication expected to be received by the second receiving unit.

2. The status providing system of claim 1, wherein the status signal is rendered in a form of at least one of an audio status signal and a video status signal.

3. The status providing system of claim 2, wherein the video status signal is rendered in a form of a viewable object that changes during passage of the determined approximate delay time by at least one of changing from a first color to a second color, changing from an outline of the object to a solid form of the object, changing from the solid form of the object to the outline of the object, changing at least one of a location, shape and size of a reference portion of the object such that when the change of the object is completed, the approximate delay time has passed and the occurrence signal has been received by the receiving unit.

4. The status providing system of claim 2, wherein the audio status signal is rendered as at least one of a predetermined sound and a slower version of the audio occurrence signal which is provided in advance of the rendering of the video occurrence signal at least until at least one of the approximate delay time has elapsed and the video occurrence signal is received by the receiving unit.

5. The status providing system of claim 2, wherein a form of the status signal provided by one of a plurality of the receiving units is different than a form of the status signal provided by another of the plurality of the receiving units.

6. The status providing system of claim 2, wherein the source unit is at a first location and the at least one receiving unit is at a second location.

7. The status providing system of claim 2, wherein the delay determining unit determines an amount of time that will elapse before the occurrence will be received by each of the receiving units, and determines the approximate delay time based on a longest determined amount of time.

8. The status providing system of claim 2, wherein the status signal is rendered as a slower version of the audio occurrence signal which is provided at least until at least one of the approximate delay time has elapsed and the video occurrence signal is received by each receiving unit, and when the video signal of the occurrence signal is received, the audio signal and the video signal are synchronized by the receiving unit and provided together such that the video occurrence signal and a remaining portion of the audio occurrence signal of the occurrence signal resemble the occurrence as much as possible.

9. The status providing system of claim 1, wherein the delay determining unit determines a round-trip delay time, the round-trip delay time being an approximate minimum amount of time that will elapse before a first occurrence signal generated by a first source unit based on a first occurrence is received at a first receiving unit and a second occurrence signal generated by a second source unit based on a second occurrence, occurring after receipt of the first occurrence signal by the first receiving unit, is received by a second receiving unit, the first source unit and the second receiving unit being at one site and the second source unit and the first receiving unit being at another site.

10. The status providing system of claim 9, wherein:
each of the first and second occurrence signals is at least one of a video occurrence signal and an audio occurrence signal captured by the first and second source units, respectively,
each of the first and second source units comprises at least one of a camera and a microphone,
each of the first and second occurrence is experienced when the at least one of the video occurrence signal and the audio occurrence signal of the first and second occurrence signal, respectively, is received by the first and second receiving units, respectively, and
each of the first and second receiving units comprises at least one a display and a speaker.

11. The status providing system of claim 10, wherein the site is at one location and the second site is at a second location, the first location being different from the second location.

12. The status providing system of claim 10, wherein the status signal is based on the determined round-trip delay time.

13. A status providing system, comprising:
delay determining means for determining an approximate delay time for experiencing, at a receiving unit, an original occurrence that is captured into an occurrence signal by a source unit, wherein the occurrence signal is at least one of a video occurrence signal and an audio occurrence signal captured by the source unit comprising at least one of a camera and a microphone, and the occurrence is experienced when the at least one of the video occurrence signal and the audio occurrence signal is received by the receiving unit comprising at least one of a display and a speaker; and
status signal providing means for providing a status signal providing, based on the determined approximate delay time, at least one of an indication that the original occurrence occurred before all portions of the occurrence signal is received by the receiving unit, an indication of the approximate delay time, and one of the portions of the occurrence signal at a slower rate than an original rate at which the portion of the occurrence signal originally transpired during the original occurrence,
wherein the occurrence signal is generated at a first source unit being used by a first participant in a teleconference and the status signal is being provided to a second receiving unit being used by a second participant in the teleconference and wherein the status signal comprises information indicative of a timing constraint on a second live communication of the second participant necessary to reduce or avoid a live communication collision with a first live communication of the first participant expected to be received by the receiving unit wherein the timing constraint comprises a delay of the first live communication expected to be received by the receiving unit.

14. The status providing system of claim 13, wherein the portions of the occurrence signal includes a video occurrence portion and an audio occurrence portion and the portion of the occurrence signal provided at the slower rate is the audio occurrence portion.

15. A status providing method for a teleconference being conducted between a first participant and a second participant, the first participant being at a first unit including a first source unit and a first receiving unit, the second participant being at a second unit including a second source unit and second receiving unit, the method comprising:
capturing an occurrence signal based on an occurrence occurring at a first time, wherein the occurrence signal is at least one of a video occurrence signal and an audio occurrence signal captured by the first source unit comprising at least one of a camera and a microphone, and the occurrence is experienced when the at least one of the video occurrence signal and the audio occurrence signal is received by the second receiving unit comprising at least one of a display and a speaker;
determining an approximate delay time, by a state tracker at the first source unit, the approximate delay time including at least an approximate amount of time that will elapse before the occurrence will be experienced at a second time after the occurrence signal is received by the second receiving unit such that the approximate delay time is approximately equal to a difference between the first time and the second time; and
providing a status signal to the second participant at the second receiving unit, the status signal being based on the occurrence and the determined approximate delay time and rendered by at least one of the first source unit and the second receiving unit at a status time, wherein the status time includes a time earlier than the second time and a time, at least beginning, upon passage of the determined approximate delay time from the first time and wherein the status signal comprises information indicative of a timing constraint on a second live communication of the second participant necessary to reduce or avoid a live communication collision with a first live communication of the first participant, expected to be received by the second receiving unit, wherein the timing constraint comprises a delay of the first live communication expected to be received by the second receiving unit.

16. The status providing method of claim 15, wherein capturing the occurrence signal comprises capturing at least one of a video occurrence signal and an audio occurrence signal based on the occurrence using at least one of a camera and a microphone.

17. The status providing method of claim 15, wherein providing the status signal comprises rendering a status signal in a form of at least one of an audio status signal and a video status signal.

18. The status providing method of claim 17, wherein providing the status signal comprises using at least one of a speaker and a display to output the at least one of the audio status signal and the video status signal.

19. The status providing method of claim 17, wherein providing the video status signal comprises rendering a video status signal in a form of an object that changes during passage of the determined approximate delay time by at least one of changing from a first color to a second color, changing from an outline of the object to a solid form of the object, changing from the solid form of the object to the outline of the object, changing at least one of a location, shape and size of a reference portion of the object such that when the change of the object is completed, the determined approximate delay time has passed and the occurrence signal has been received by the receiving unit.

20. The status providing method of claim 17, wherein providing the audio status signal comprises rendering at least one of a predetermined sound and a slower version of the audio occurrence signal which is provided in advance of the rendering of the video occurrence signal at least until at least one of the approximate delay time has elapsed and the video occurrence signal is received by the receiving unit 21. The status providing method of claim 17, wherein providing the status signal comprises providing one form of the status signal at one of the receiving units and another form of the status signal at another of the receiving units.

22. The status providing method of claim 17, wherein determining the approximate delay time includes determining an amount of time that will elapse before the occurrence will be received by each of the receiving units and determining the approximate delay time based on a longest determined amount of time.

23. The status providing method of claim 17, wherein providing the status signal comprises:
rendering a status signal which is a slower version of the audio occurrence signal in advance of the rendering of the video occurrence signal at least until at least one of the approximate delay time has elapsed and the video occurrence signal is received by the receiving unit, and
when the video signal of the occurrence signal is received, providing in a substantially synchronized manner the audio occurrence signal and the video occurrence signal of the occurrence signal such that the video occurrence signal and a remainder of the audio occurrence signal of the occurrence signal resemble the occurrence as much as possible.

24. A system for mediating a teleconference to reduce collisions happening as a result of data transmission delays, the system comprising:
a state tracker for determining an approximate delay time including an approximate time elapsed before an occurrence by a first participant, at a first time, at a source unit is experienced by a second participant, at a second time, at a receiving unit, the approximate delay time being approximately equal to a difference between the first time and the second time and the occurrence being captured into an occurrence signal by the source unit, wherein the occurrence signal is at least one of a video occurrence signal and an audio occurrence signal captured by the source unit comprising at least one of a camera and a microphone, and the occurrence is experienced when the at least one of the video occurrence signal and the audio occurrence signal is received by the receiving unit comprising at least one of a display and a speaker; and
a user interface for generating a status signal at a status time for being provided to the second participant at the receiving unit, the status signal informing the second participant of a status of the occurrence signal and the status time being based on the approximate delay time,
the source unit transmitting additional data generated from the occurrence signal over a second communication line and transmitting the occurrence signal via a first communication line, the status signal being generated based on the additional data, and
wherein the second communication line is faster than the first communication line and the status time occurs earlier than the second time and wherein the stabs signal comprises information indicative of a timing constraint on a second live communication of the second participant necessary to reduce or avoid a live communication collision with a first live communication of the first participant, expected to be received by the receiving unit, wherein the timing constraint comprises a delay of the first live communication expected to be received by the receiving unit.

25. The system of claim 24, wherein the status signal is further provided to the first participant.

26. A system for mediating a teleconference to reduce collisions happening as a result of a data transmission delay, the delay being before an occurrence by a first participant, at a first time, at a source unit, is experienced by a second participant, at a second time, at a receiving unit, the occurrence being captured into an occurrence signal by the source unit, wherein the occurrence signal is at least one of a video occurrence signal and an audio occurrence signal captured by the source unit comprising at least one of a camera and a microphone, and the occurrence is experienced when the at least one of the video occurrence signal and the audio occurrence signal is received by the receiving unit comprising at least one of a display and a speaker, the system comprising:
a user interface for generating a status signal at a status time for being provided to the second participant at the receiving unit, the status signal informing the second participant of a status of the occurrence signal,
the source unit transmitting additional data generated from the occurrence signal using a second transmission protocol and transmitting the occurrence signal using a first transmission protocol, the status signal being generated based on the additional data, and wherein the second transmission protocol is faster than the first transmission protocol and the status time occurs earlier than the second time and wherein the status signal comprises information necessary to reduce or avoid a live communication collision with a first live communication of the first participant, expected to be received by the receiving unit.

27. A system for mediating a teleconference to reduce collisions happening as a result of a data transmission delay, the delay being before an occurrence by a first participant, at a first time, at a source unit, is experienced by a second participant, at a second time, at a receiving unit, the occurrence being captured into an occurrence signal by the source unit, wherein the occurrence signal is at least one of a video occurrence signal and an audio occurrence signal captured by the source unit comprising at least one of a camera and a microphone, and the occurrence is experienced when the at least one of the video occurrence signal and the audio occurrence signal is received by the receiving unit comprising at least one of a display and a speaker, the system comprising:

a user interface for generating a status signal at a status time for being provided to the second participant at the receiving unit, the status signal informing the second participant of a status of the occurrence signal, the source unit transmitting additional data generated from the occurrence signal using a second encoding and decoding process and transmitting the occurrence signal using a first encoding and decoding process, the status signal being generated based on the additional data, and wherein the second encoding and decoding process is faster than the first encoding and decoding process and the status time occurs earlier tan the second time and wherein the status signal comprises information necessary to reduce or avoid a live communication collision with a first live communication of the first participant, expected to be received by the receiving unit.

* * * * *